United States Patent [19]

Johnson

[11] 4,141,200
[45] Feb. 27, 1979

[54] AUTOMATIC HEADER ADJUSTMENT FOR HARVESTERS

[75] Inventor: Howard B. Johnson, Woodland, Calif.

[73] Assignee: Johnson Farm Machinery Co., Inc., Woodland, Calif.

[21] Appl. No.: 736,032

[22] Filed: Oct. 27, 1976

[51] Int. Cl.² .................. A01D 46/20; A01D 75/28
[52] U.S. Cl. ........................... 56/10.2; 56/DIG. 15; 171/9
[58] Field of Search ............... 56/10.4, 10.2, 327 R, 56/DIG. 15; 171/17, 62, 9

[56] References Cited

U.S. PATENT DOCUMENTS

| 2,514,764 | 7/1950 | Herigstad | 56/208 |
| 3,437,151 | 4/1969 | Button | 56/327 R |
| 3,886,718 | 6/1975 | Talbot | 56/208 |

*Primary Examiner*—Russell R. Kinsey
*Assistant Examiner*—Robert P. Swiatek
*Attorney, Agent, or Firm*—Townsend and Townsend

[57] ABSTRACT

A vine crop, e.g. tomato harvester is disclosed which has a crop processing mechanism that is movable through a field and a rearwardly and upwardly inclined elevator or header that is pivotally connected to a forward end of the processing mechanism. A leading edge of the elevator is proximate the ground and a level control wheel is vertically movably connected to the header and positioned forward of its leading edge. The wheel is defined by a multiplicity of tines, the free ends of which engage the ground so that the wheel rolls over the ground as the harvester moves through the field. The tines have a longitudinally convex configuration facing in the direction of rotation of the wheel. A control mechanism is actuated by relative vertical movements of the wheel for raising and lowering the leading edge of the elevator in response to ground surface irregularities sensed by the wheel.

10 Claims, 3 Drawing Figures

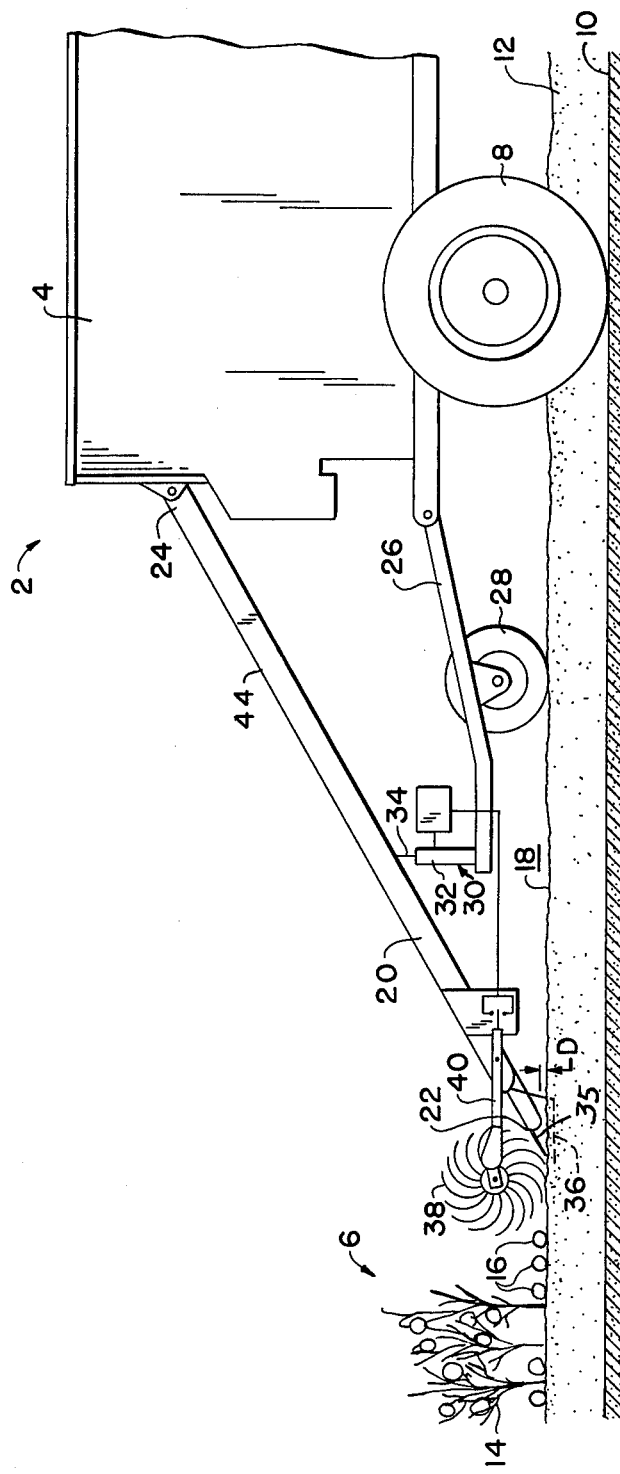
FIG.—1.

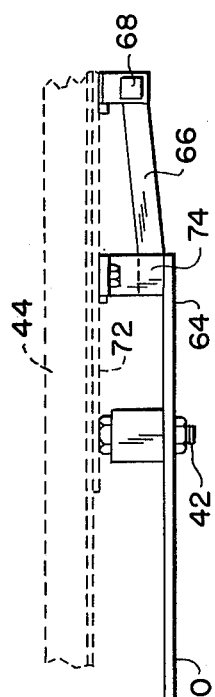
FIG._3.
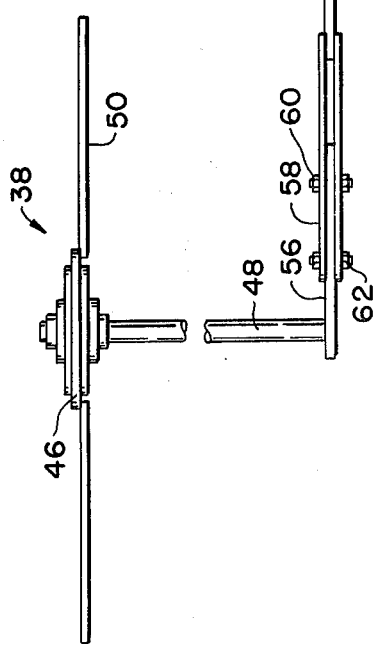
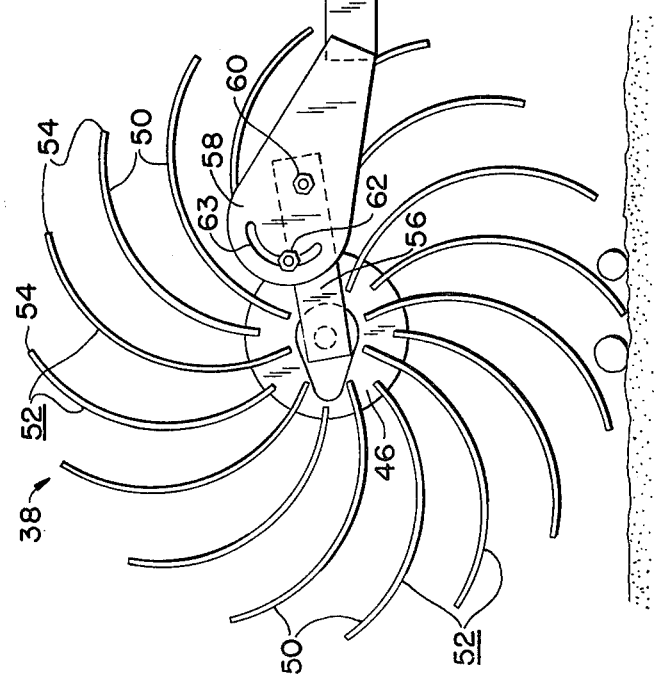
FIG._2.

AUTOMATIC HEADER ADJUSTMENT FOR HARVESTERS

BACKGROUND OF THE INVENTION

Vine crop, e.g. tomato harvesters for the infield recovery of tomatoes by separating them from the vines are presently widely used. Such a harvester is described, for example, in U.S. Pat. No. 3,437,151.

Briefly, automatic tomato harvesters are large, normally self-propelled machines which move along rows of tomato plants in the field. A knife severs the tomato vines from the roots and the vines together with attached tomatoes are then picked up by a rearwardly and upwardly inclined elevator which transports the vines and the tomatoes to a tomato processing apparatus, normally a shaker. In the shaker the vines are subjected to vibrations to loosen the tomatoes from the vines. The tomatoes are collected while the vines are discharged to the ground and later plowed under.

The severing of the vines from the root stock and the initial pick-up of the vines by the elevator are critical operations. For an efficient operation, it is necessary to pick up substantially all tomatoes and further to minimize the pick up of dirt and debris. This requires that the lowermost or leading edge of the elevator be positioned closely adjacent the ground at a constant spacing with respect thereto. Since the wheels on which the harvester moves through the field ride in furrows between the tomato rows relative irregularities between the furrows and the row surfaces as well as ground surface irregularities in the rows can cause variations in the distance between the leading edge of the elevator and the ground. Thus, the leading edge moves too close to the ground so that it contacts the soil and picks up undesirable dirt. Alternatively, the leading edge may be raised too high so that not all of the tomatoes are collected.

To alleviate this problem, it has been suggested to provide control mechanism which maintains the spacing between the ground surface and the leading edge of the elevator relatively constant. Generally speaking, such mechanisms included a sensor wheel or shoe mounted to the elevator adjacent to but aft of the leading edge. The intent of such sensors was to raise or lower the leading edge in response to relative vertical movements of the harvester or in response to surface irregularities such as mounds of soil or soil depressions. Such sensors are disclosed, for example, in U.S. Pat. Nos. 3,550,362; 3,643,407; 3,851,451; and 3,704,574.

A shortcoming of these sensors is their positioning relative to the leading edge. Since the sensors are disposed aft of the leading edge, the latter arrives at a surface irregularity ahead of the sensor. Consequently, the sensor cannot timely adjust the relative vertical position of the leading edge so that the edge, at least for a while, is either too high or too low, leading to the above-discussed drawbacks.

In addition, in instances in which sensor wheels were employed, the wheels were fitted with radial arms the free ends of which were permitted to ride over the ground and sense the distance between the header and the ground surface. It is apparent that as the wheel rolls over the ground the radially oriented tines had a tendency to spear and thus damage soft fruit such as tomatoes. Tomatoes damaged in this manner became, of course, unusable and had to be discarded. Moreover, the tines further tended to spear and pick up vines which could become entangled in the sensor wheel and render it inoperative. This, in turn, required that the harvester be stopped and the sensor wheel be cleaned which entailed costly harvester downtimes and was, therefore, economically undesirable.

It is believed that the above-discussed short-comings of prior art sensors were at least in part responsible for the rather common absence of automatic elevator adjustment mechanisms on harvesters used in the field. Instead, the operator of the harvester had the responsibility of manually controlling the relative height of the leading elevator edge. This commanded his constant attention, leaving him correspondingly less time to attend to the other functions of the machine which could in turn adversely affect the harvesting operation.

SUMMARY OF THE INVENTION

The present invention provides an automatic adjustment of the relative position of the elevator leading edge of a vine corp harvester with respect to the ground so that the distance between the leading edge and the ground surface can be kept substantially constant irrespective of ground surface irregularities, depressions in the furrows in which the harvester wheels ride and the like.

Generally speaking, a harvester constructed in accordance with the present invention comprises a crop, e.g. a tomato processing mechanism such as a shaker which is movable over a tomato field in a forward direction. A crop elevator for feeding the tomatoes and tomato vines to the shaker extends therefrom in a forward direction. The elevator has a lowermost edge that is proximate the ground and it extends rearwardly and upwardly therefrom towards the shaker. The elevator includes means for moving the leading edge vertically relative to the shaker to permit adjustments of the leading elevator edge in response to ground surface irregularities so that the position of the leading edge relative to the ground can be maintained substantially constant. Normally, a blade or the like is attached to the vertically movable portion of the elevator for severing the vines from their roots preparatory to their deposition on the elevator.

The present invention provides a sensor wheel that is defined by a hub and a multiplicity of generally radially oriented tines that project from the hub. The tines have a curved configuration and they are generally disposed in a plane of rotation of the wheel so that a convex side or portion of each tine faces in the same rotational direction as the wheel. The wheel is mounted to the elevator for movement with the leading edge in a vertical direction. The means mounting the wheel to the elevator permit relative, substantially vertical movements of the wheel with respect to the leading elevator edge. The wheel is positioned so that it is disposed forward of the leading elevator edge and within the lateral extent of the elevator. The free ends of the tines contact the ground when the harvester moves through the field to induce a corresponding rotation of the wheel. The tines are mounted to the hub so that the convex tine portions face in the direction of rotation of the wheel.

Control means is operatively coupled with the wheel mounting means and the means for moving the leading edge of the elevator in a vertical direction for raising or lowering the leading edge in response to relative vertical movements of the wheel due to ground surface irregularities and the like.

The above summarized harvester and, in particular, the sensing mechanism for maintaining the distance between the leading elevator edge and the ground constant eliminates shortcomings found in prior art systems intended to perform the same task. The sensor wheel of the present invention is positioned immediately forward of the leading edge so that the wheel senses and responds to surface irregularities just ahead of the elevator. Thus, the leading elevator edge can be raised or lowered, as the case may be, as the surface irregularities are sensed. The above-discussed drawbacks of sensing the irregularities aft of the leading edge, as was done in the prior art, are thereby eliminated. Further, by mounting the wheel within the lateral extent of the elevator, instead of to the side thereof, the ground surface actually underlying the leading elevator edge rather than some other, adjacent ground surface is being sensed for surface irregularities. A more accurate operation is thereby achieved.

In addition to the superior sensing characteristics, the sensor wheel employed by the present invention is constructed of a multiplicity of convexly curved tines in which the convex tine surfaces face in the direction of rotation of the sensor wheel. In this manner, the free tine ends do not radially stab into the ground, vines or tomatoes but approach them at an angular inclination and with a rolling motion, or at least a motion that includes a rolling component. Tomatoes and vines which lie in the path of the sensor wheel are thus gently pushed to the side by the convexly curved portions of the tines instead of being stabbed by the radially oriented end of a straight tine. Tomato damage and a resulting crop loss from the sensor wheel is thereby greatly reduced or eliminated. Further, the danger of vines becoming entangled on the sensor wheel and rendering it inoperative is overcome.

In sum and substance, therefore, the present invention substantially simplifies the operation of tomato and similar crop harvesters by automating the position control of the inclined crop elevator. This leaves the operator of the harvester correspondingly more time to control and supervise the harvesting operation. In addition, the construction of the elevator height control system and, in particular, of the sensor wheel as well as its positioning improves the operating accuracy of the control system and eliminates crop damage and potential failures of the control system. Accordingly, the present invention results in a greater operating efficiency of tomato harvesters and the like.

BRIEF DESCRIPTION OF THE DRAWINGS

FIG. 1 is a schematic, side elevational view showing a tomato harvester having an upwardly inclined crop elevator fitted with an elevator height control apparatus constructed in accordance with the present invention;

FIG. 2 is an enlarged, fragmentary, side elevational view of the elevator height control system and shows a sensor wheel constructed in accordance with the present invention in detail; and FIG. 3 is a fragmentary plan view of the control system and sensor wheel illustrated in FIG. 2.

DESCRIPTION OF THE PREFERRED EMBODIMENTS

Referring first to FIG. 1, a tomato harvester 2 constructed, for example, as more fully described in the above-referenced U.S. Pat. No. 3,437,151, generally comprises a fruit or tomato processing mechanism 4 including a tomato vine shaker (not separately shown), the necessary tomato transporting belts (not separately shown), and the like (all of which is well-known in the art) carried by and propelled through a tomato field 6 by suitably mounted wheels 8 which ride in furrows 10 disposed between raised planting rows 12 of the field. Tomato vines 14 growing in the field rows (some tomatoes 16 may lie loose on row ground surface 18) are harvested in the conventional manner.

For that purpose, an elevator 20 (which may, for example, be a power-driven chain link conveyor) protrudes in a forward direction, that is to the left as seen in FIG. 1 from an upper portion of the processing mechanism 4. A leading edge 22 of the elevator is proximate ground surface 18 and the elevator extends rearwardly and upwardly from the leading edge where its aft end 24 is pivotally connected to the processing mechanism so that the elevator and, in particular, the leading edge 22 thereof can be raised and lowered in a generally vertical direction. A support structure 26 for the elevator extends forwardly from a lower portion of the processing mechanism and is supported on ground surface 18 by an idler wheel 28. A hydraulic actuator 30 or the like has its cylinder 32 supported by support structure 26 and its piston 34 connected to elevator 20 so that the elevator can be raised or lowered by correspondingly energizing the actuator.

A vine cutoff knife or blade 35 is conventionally attached to the elevator adjacent its leading edge 22 and is positioned so that the blade severs the vines from their roots slightly below the ground surface 18. The construction, operation and positioning of such blade is conventional and, therefore, not further described herein.

The manner of operating the harvester should now be apparent. To briefly summarize it, the harvester is driven through the field so that its wheels 8 ride in furrows 10 and the elevator is positioned so that the leading edge thereof just clears ground surface 18 (by a distance D of say one inch) while blade 35 is disposed slightly below ground. As the harvester advances, the blade first severs the vines and they are thereafter picked up by the lowermost portion of the elevator. The elevator carries the vines upwardly and rearwardly into the processing mechanism 4 where the tomatoes are separated from the vines, culled and thereafter collected in a truck drawn alongside the harvester.

It is apparent that irregularities in ground surface 18, such as surface depressions or soil mounds, as well as differences in the elevation between the ground surface and furrows 10 supporting harvester wheels 8 will cause variations in the distance D between leading edge 22 of elevator 20 and the ground surface as the harvester advances through the field.

Consequently, unless the position of the elevator, and in particular, of its leading edge is adjusted to compensate for such variations, the leading edge might from time to time contact or even dig into the ground or it may be spaced a relatively large distance thereabove so that tomato vines and/or loose tomatoes on the ground surface will not be picked up. To overcome this danger without requiring the operator's constant attention, and referring now to FIGS. 1-3, the present invention provides an adjustment mechanism for automatically raising or lowering the leading edge 22 of the elevator in response to such ground surface irregularities and/or relative vertical movements of the harvester in respect to the ground surface 18.

Generally speaking, this adjustment mechanism broadly comprises a sensor wheel 38 positioned forward of leading elevator edge 22 and rotatably mounted to a generally horizontally extending arm 40 that is pivotable about a horizontal axis defined by a pivot shaft 42 protruding laterally from a side member 44 of the elevator. It will be observed that pivotal movements of the horizontal arm cause relative, substantially vertical movements of the sensor wheel.

The sensor wheel is defined by a central hub 46 which positions a multiplicity of generally radially outwardly extending tines 50 and which is rotatably mounted on a shaft 48. The tines have like configuration and are longitudinally curved so that each of them defines a convex tine side 52. As a result of the longitudinal curvature of the tines, their free ends 54 have a non-radial orientation. The convex tine sides 52 face in the same direction and the tines are arranged so that they generally lie in the plane of rotation of hub 46. The hub is further mounted to shaft 48 so that the convex tine sides face in a counterclockwise direction, as viewed in FIG. 2.

For purposes more fully described hereinafter, hub shaft 48 is secured to an adjustment bar 56 which in turn is mounted to a free end 58 of horizontal arm 40 with a pivot pin 60. The free end of the horizontal arm further includes a slot that is concentric with pivot pin 60 and through which a bolt extends. The bolt is fastened, e.g. welded to adjustment bar 56 so that the bar can be locked in various relative angular positions within the confines of arcuate slot 63 by correspondingly tightening a lock nut 62.

Horizontal arm 40 extends rearwardly, that is to the right as viewed in FIG. 2, and terminates in an aft end 64. A flat, horizontal leaf spring 66 projects rearwardly from aft end 64 and is disposed between an upper and a lower limit switch 68, 70 respectively, mounted to a side plate 72 depending generally downwardly from elevator side member 44. The limit switches are mounted so that they are closed by the horizontal leaf spring 66 when the horizontal arm 40 pivots about shaft 42 in a clockwise or counter-clockwise direction. Upper and lower stop plates 74 and 76, respectively, are also secured to side plate 70 and they are positioned so that they limit the pivotal movement of the horizontal arm 40 to prevent excessive deformation of the leaf spring due to pivotal arm movements and a resulting excessive pressure on the limit switches.

The limit switches are electrically connected with a suitable flow control valve 78 which in interposed in a hydraulic line 80 between a source of pressurized hydraulic fluid 82 and hydraulic actuator 30. Thus, the actuator is energized to raise elevator 20 when lower limit switch 70 is closed by leaf spring 66 and the hydraulic actuator is energized to lower the elevator when upper limit switch 68 is closed by the leaf spring.

In use, the relative position of sensor wheel 38 with respect to horizontal arm 40 is first set by loosening lock nut 62 and positioning adjustment bar 56 so that free tine ends 54 contact the ground when the horizontal bar is in its horizontal position and the leading edge 22 of elevator 20 is at the desired distance D from ground surface 18. Thereafter lock nut 62 is tightened and the harvesting operation can commence.

As the harvester advances through the field the free tine ends contact the ground surface and induce the sensor wheel to rotate in a counter-clockwise direction, as seen in FIGS. 1 and 2. As is best seen in FIG. 2, tomatoes and vines on the ground are contacted by convex tine sides 52 which roll over the tomatoes and tend to push the tomatoes to the side without spearing and damaging them and without spearing and picking up vines from the ground. To assure that the sensor wheel rolls over ground surface actually covered by the elevator, hub mounting shaft 48 is sufficiently elongated so that the sensor wheel is disposed within the lateral extent of the elevator as is best illustrated in FIG. 3.

So long as the ground surface 18 remains flat and there are no changes in the relative elevation between the ground surface and furrows 10, arm 40 remains in its horizontal position, both limit switches 68 and 70 remain open, and the hydraulic actuator 30 remains inactive. Should the sensor wheel roll over a portion of the ground surface which includes a depression, the wheel together with horizontal arm 40 gravitationally pivots about shaft 42 in a counter-clockwise direction, as seen in FIG. 2, due to the imbalance of the combined arm and wheel. This raises the aft end of leaf spring 66 and closes limit switch 68 which in turn actuates solenoid valve 78 so that the hydraulic actuator 30 is energized to lower the leading edge 22 of the elevator until arm 40 is in its substantially horizontal position again, at which point the leading edge is spaced from the ground surface the desired distance D, limit switch 68 is open again, and the hydraulic actuator is de-energized. Since the sensor wheel is immediately forward of the leading edge the adjustment takes place as the leading edge approaches the depression in the ground surface. Thus, the desired spacing between the leading edge and the ground surface is substantially maintained at all times.

Conversely, if the leading edge encounters a raised mound of soil, pivot arm 40 is pivoted in a clockwise direction, as seen in FIG. 2, to close limit switch 70 by moving leaf spring 66 downwardly into the position illustrated in phantom lines in FIG. 2. Closure of the lower limit switch actuates the solenoid valve to energize hydraulic actuator 30 so that it raises the elevator until arm 40 is again in its horizontal position and the desired distance D between the leading elevator edge and the ground surface is re-established.

The same action occurs if the relative position of the harvester as a whole is lowered or raised due to changes in the elevation between the ground surface 18 and the furrows 10, depressions or raised areas in the furrows, etc.

Thus, the present invention provides a continuous automatic adjustment of the elevator and, in particular, of the leading edge thereof as the harvester advances through the field without requiring attention from the operator of the harvester. A more efficient and thorough harvesting operation is thereby achieved.

It should be noted that the construction of the elevator and its mounting to the remainder of the harvester can, of course, be altered from what is shown and described herein. For example, it might be advantageous to pivotally mount the lowermost portion of the elevator only, while the remainder thereof is fixedly secured to the processing mechanism so that the vertical adjustment of the leading edge can be accomplished with a lesser force. Similarly, the hydraulic actuator can be replaced with a mechanical actuator, the limit switches can be deleted and replaced with suitable valves directly actuated by the horizontal leaf spring etc. Such changes are within the purview of those skilled in the art and, therefore, are within the scope of this invention.

I claim:

1. A harvester for retrieving and handling plants growing in a field comprising a plant handling apparatus; means for moving the apparatus over the field; plant pick-up means attached to the apparatus and constructed for moving plants from the ground in a generally rearward and upward direction to the handling means, the pick-up means including a leading edge disposed forward of the apparatus and proximate the ground; sensing means disposed forward of the leading edge and connected to the pick-up means for sensing the position of the leading edge of the pick-up means relative to the ground, said sensing means further comprising a sensing wheel having a rotatably mounted hub and a multiplicity of tines projecting outwardly from the hub so that the tine ends engage the ground surface as the sensing wheel rotates, at least a portion of each tine adjacent its outermost end having a convex curvature with respect to the direction of rotation of the wheel; and adjustment means operatively coupled with the sensing means and the pick-up means for raising and lowering the leading edge of the pick-up means relative to the ground portion; whereby a predetermined, substantially constant spacing between the leading edge and the ground can be maintained irrespective of ground surface irregularities and a piercing of plants by the outermost tine ends of the sensing wheel is substantially prevented.

2. A harvester according to claim 1 wherein the adjustment means comprises arm means mounting the wheel to the pick-up means for relative, generally vertical movement of the wheel with respect to the leading edge, and means responsive to relative vertical movements of the arm means for correspondingly raising or lowering the pick-up means to thereby maintain the spacing between the leading edge and the ground surface substantially constant.

3. A harvester according to claim 1 including means positioning the sensing means within the lateral extent of the pick-up means.

4. A harvester according to claim 1 wherein the tines have a substantially continuous concave configuration from the hub to their outermost ends.

5. In a harvester for harvesting vine-type plants having a plant processing section movable over a field; plant elevator means mounted to the section and extending forwardly from the section and in a relatively downward direction, terminating in a leading elevator edge disposed proximate the ground surface; vine severing means attached to the elevator means for severing the vines from their roots; and sensing means for maintaining the position of the leading elevator edge and of the severing means with respect to the ground surface relatively constant, the improvement to the sensing means comprising: a sensor wheel contacting the ground and driven by movement of the harvester over the ground and defined by a multiplicity of generally radially oriented tines for sensing the relative height of the leading edge and the severing means, the tines having like, curved configurations at least adjacent their outermost ends; means mounting the wheel to the elevator means so that the wheel is disposed within the lateral extent of the elevator means and a convex section of the curved tines faces in the direction of rotation of the wheel as the harvester moves over the field; and means operatively coupled with the mounting means and the elevator means for raising and lowering the leading edge and the severing means in response to ground surface irregularities so that the spacing between the ground surface and the leading edge and the severing means is kept substantially constant.

6. A harvester according to claim 5 wherein the wheel mounting means further includes means positioning the wheel forward of at least one of the leading edge and the severing means relative to the travel direction of the harvester through the field.

7. A harvester movable through a field for harvesting a crop growing in the field comprising in combination a crop processing apparatus including means for moving the apparatus over the field in a foward direction; a crop elevator having a leading edge disposed forward of the apparatus and in relatively close proximity of the ground and extending rearwardly and upwardly from the leading edge for transporting crop from the ground to the apparatus; and means for raising and lowering the leading edge at a substantially constant position relative to the ground as the harvester moves through the field, the raising and lowering means including a sensor wheel disposed forward of the leading edge, said wheel being rotatable about a substantially horizontal axis and connected to the elevator portion, the sensor wheel including a hub and tines projecting from the hub so that free ends of the tines contact the ground and rotate the wheel when the harvester moves through the field, the tines having further a longitudinally convex surface oriented to face in the direction of rotation of the wheel when the harvester moves through the field.

8. A vine crop harvester comprising in combination:
a crop processing apparatus including means for moving the apparatus over a vine crop field, in a forward direction;
a crop elevator for feeding the crop being harvested to the apparatus and extending from the apparatus in a forward direction, the elevator having a lowermost edge proximate the ground and extending rearwardly and upwardly towards the apparatus, the elevator further including means for moving the leading edge vertically relative to the apparatus to permit adjustments of the leading elevator edge in response to ground surface irregularities so that the position of the leading edge relative to the ground can be maintained substantially constant;
means connected with the apparatus for severing the crop preparatory to the deposition of the severed crop on the elevator;
a sensor wheel defined by a hub and a multiplicity of generally radially oriented, like tines, the tines having a curved configuration and being generally disposed in the plane of rotation of the wheel so that a convex portion of each tine faces in the same rotational direction of the wheel;
means for mounting the wheel to the elevator for movement of the wheel with the leading edge in a vertical direction, the mounting means permitting relative, substantially vertical movements of the wheel with respect to the leading edge and positioning the wheel so that the wheel is disposed forward of the leading edge and within the lateral extent of the elevator and further so that free ends of the tines contact the ground when the harvester is moved through the field to cause a corresponding rotation of the wheel, the convex tine portions facing in the direction of rotation of the wheel; and
control means operatively coupled with the mounting means and with the means for moving the leading edge vertically for raising and lowering the leading edge in response to relative vertical movements of the wheel due to ground surface irregularities;

whereby the wheel and the control means sense surface irregularities and cause a corresponding adjustment of the position of the leading edge to maintain the position of the leading edge relative to the ground surface substantially constant.

9. A harvester according to claim 8 wherein the mounting means for the wheel comprises a pivot arm having a first section rotatably mounting the wheel and a second, spaced apart section pivotally connected to the elevator for pivotal movements of the arm about a horizontal pivot axis to cause corresponding relative vertical movements of the wheel.

10. A harvester according to claim 9 including means for changing the position of the wheel relative to the pivot arm.

* * * * *